United States Patent
Morita et al.

(10) Patent No.: US 10,677,937 B2
(45) Date of Patent: Jun. 9, 2020

(54) RADIATION IMAGING APPARATUS, RADIATION IMAGING SYSTEM, AND METHOD FOR CONTROLLING RADIATION IMAGING APPARATUS

(71) Applicant: CANON KABUSHIKI KAISHA, Tokyo (JP)

(72) Inventors: Hideaki Morita, Tokyo (JP); Toshiya Ishioka, Kawasaki (JP); Akehiko Uchiyama, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 329 days.

(21) Appl. No.: 15/359,469

(22) Filed: Nov. 22, 2016

(65) Prior Publication Data

US 2017/0153333 A1 Jun. 1, 2017

(30) Foreign Application Priority Data

Nov. 28, 2015 (JP) ................. 2015-232530

(51) Int. Cl.
*G01T 1/17* (2006.01)
*G01T 1/24* (2006.01)
(Continued)

(52) U.S. Cl.
CPC ............... *G01T 1/17* (2013.01); *G01T 1/247* (2013.01); *G06F 3/1415* (2013.01); *H04N 5/32* (2013.01)

(58) Field of Classification Search
CPC .... A61B 6/00; A61B 6/42; A61B 6/52; A61B 6/56; A61B 6/563; A61B 6/566; A61B 6/586; G06T 1/00; G06T 1/0007; G06T 1/20; G06T 1/60; G06T 2200/28; G06T 2201/00; G06T 2207/10072; G06T 2207/10081; G06T 2207/20; G06T 2210/41; G06T 2211/40; G01T 1/17; G01T 1/247; H04N 5/32; H04N 5/335; H04N 5/3355; H04N 5/345; G06F 3/0668; G06F 3/067; G06F 3/0671; G06F 3/0673;
(Continued)

(56) References Cited

U.S. PATENT DOCUMENTS

2004/0258204 A1* 12/2004 Nokita .................... A61B 6/00
378/91
2010/0017573 A1* 1/2010 Shinozaki .......... G06F 11/1662
711/162
(Continued)

FOREIGN PATENT DOCUMENTS

CN 1573534 A 2/2005
CN 1691644 A 11/2005
(Continued)

*Primary Examiner* — Anastasia Midkiff
(74) *Attorney, Agent, or Firm* — Canon U.S.A., Inc. IP Division

(57) ABSTRACT

A radiation imaging apparatus includes a radiation detector, a storage unit, and a transfer unit. The radiation detector detects radiation transmitted through an object. The storage unit stores a radiation image based on the detected radiation. The transfer unit transfers the radiation image to an external information processing apparatus. The storage unit identifiably stores the radiation image to identify whether the radiation image is a radiation image transferred to the external information processing apparatus.

32 Claims, 6 Drawing Sheets

(51) Int. Cl.
*G06F 3/14* (2006.01)
*H04N 5/32* (2006.01)

(58) Field of Classification Search
CPC ........ G06F 3/0674; G06F 3/14; G06F 3/1415;
G06F 7/06; G06F 7/08; G06F 7/10; G06F
7/20; G06F 7/76; G06F 11/3065; G06F
11/3068; G06F 11/3072; G06F 11/3075;
G06F 11/32; G06F 11/34; G06F 11/3438;
G06F 2003/0692; G06F 2003/0697; G06F
2212/154; G06F 2212/251
See application file for complete search history.

(56) References Cited

U.S. PATENT DOCUMENTS

| | | | |
|---|---|---|---|
| 2010/0148076 A1 | 6/2010 | Nishino | |
| 2011/0122995 A1* | 5/2011 | Ferro, Jr. | A61B 6/4429 378/62 |
| 2013/0123603 A1* | 5/2013 | Shin | A61B 6/463 600/407 |
| 2015/0089097 A1* | 3/2015 | Isoda | G06F 3/0613 710/58 |

FOREIGN PATENT DOCUMENTS

| | | |
|---|---|---|
| CN | 102160067 A | 8/2011 |
| JP | H01-238653 A | 9/1989 |
| JP | 2008-134057 A | 6/2008 |
| JP | 2010-022702 A | 2/2010 |
| JP | 2010-190911 A | 9/2010 |
| JP | 2010-250292 A | 11/2010 |
| JP | 2015-198923 A | 11/2015 |
| WO | 2006/101232 A1 | 9/2006 |

* cited by examiner

RADIATION IMAGING APPARATUS, RADIATION IMAGING SYSTEM, AND METHOD FOR CONTROLLING RADIATION IMAGING APPARATUS

BACKGROUND OF THE INVENTION

Field of the Invention

Embodiments of the present invention relate to a radiation imaging apparatus, a radiation imaging system, and a method for controlling the radiation imaging apparatus.

Description of the Related Art

A radiation imaging apparatus using a flat panel detector made of semiconductor materials has recently been put to practical use as an imaging apparatus for medical image diagnosis and non-destructive inspection using radiations. Such a radiation imaging apparatus is used, for example, in radiation image diagnosis as a digital radiation imaging apparatus for capturing a still image, such as general radiography, or capturing a moving image, such as fluoroscopic imaging. In a radiation imaging system using the radiation imaging apparatus, a user transfers the captured image to an information processing apparatus and displays the image for image diagnosis.

Japanese Patent Application Laid-Open No. 2010-190911 discusses a radiation imaging apparatus that can store radiation images captured by the radiation imaging apparatus into a storage unit and transfer the stored radiation images to an external information processing apparatus.

According to the radiation imaging apparatus discussed in Japanese Patent Application Laid-Open No. 2010-190911, the user may omit transfer of the captured radiation images, even if the user has the intention of transferring the radiation images to the information processing apparatus. In such a case, if the user captures new images, the radiation images omitted to be transferred and the new captured radiation images can become mixed in the storage unit. This complicates distinction of a plurality of captured images, and there has been a possibility that the user may be unable to quickly make an image diagnosis or may need to perform imaging again.

SUMMARY OF THE INVENTION

An embodiment of the present invention is directed to providing a technique advantageous in facilitating identification of a plurality of mixed radiation images in a radiation imaging apparatus including a storage unit that stores radiation images.

According to an aspect of the present invention, a radiation imaging apparatus includes a radiation detector configured to detect radiation transmitted through an object, a storage unit configured to store a radiation image based on the detected radiation, and a transfer unit configured to transfer the radiation image to an external information processing apparatus, wherein the storage unit is configured to identifiably store the radiation image to identify whether the radiation image is a radiation image transferred to the external information processing apparatus.

Further features of the present invention will become apparent from the following description of exemplary embodiments with reference to the attached drawings.

DESCRIPTION OF THE EMBODIMENTS

A first exemplary embodiment will be described in detail with reference to FIGS. 1 to 5.

Figure 1:
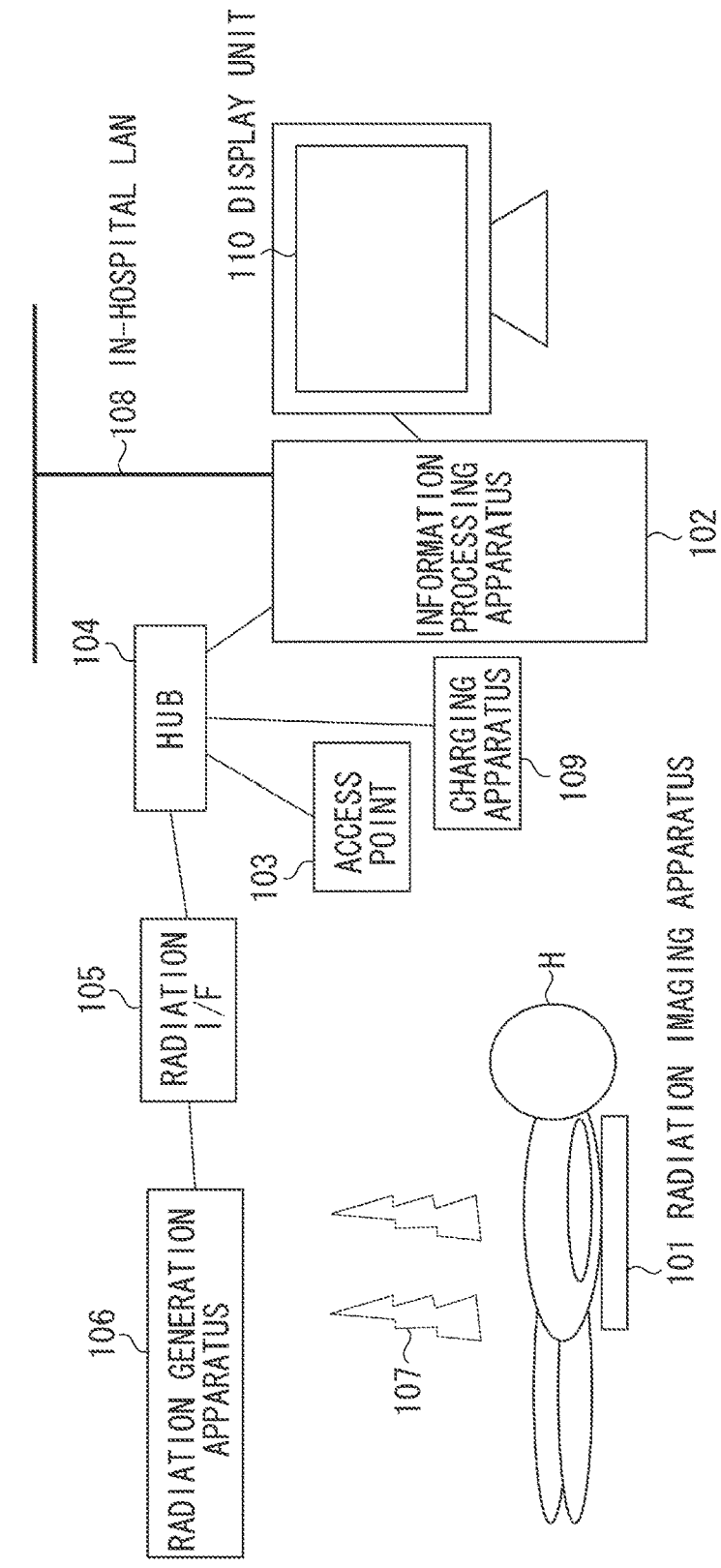
FIG. 1 is a diagram illustrating a radiation imaging system according to a first exemplary embodiment.

A configuration of a radiation imaging system 100 according to the present exemplary embodiment will initially be described with reference to FIG. 1. FIG. 1 is a diagram illustrating the radiation imaging system 100 according to the present exemplary embodiment. The radiation imaging system 100 includes a radiation imaging apparatus 101, for medical image diagnosis and non-destructive inspection, for example, an information processing apparatus 102, and a radiation generation apparatus 106. To connect such apparatuses, the radiation imaging system 100 includes an access point 103, a hub 104, and a radiation interface (hereinafter, abbreviated as radiation I/F) 105. The radiation imaging system 100 may further include a charging apparatus 109 (cradle).

In the radiation imaging system 100 illustrated in FIG. 1, radiations 107 emitted from the radiation generation apparatus 106 are transmitted through an object H to reach the radiation imaging apparatus 101. The radiation imaging apparatus 101 detects the reached radiations 107 and generates a radiation image. The generated radiation image is transferred to the information processing apparatus 102 and displayed on a display unit 110.

The radiation imaging apparatus 101 is an apparatus that captures a radiation image based on the radiations 107 transmitted through the object H. An example of the radiation imaging apparatus 101 is a portable radiation imaging apparatus. A specific configuration will be described below with reference to FIG. 2.

The information processing apparatus 102 has a function of controlling the entire radiation imaging system 100 in a centralized manner. The information processing apparatus 102 can obtain the radiation image captured by the radiation imaging apparatus 101 via wired or wireless communication. The information processing apparatus 102 functions as a display control apparatus for controlling the display unit 110 to display the obtained radiation image. The information processing apparatus 102 performs control for setting an imaging mode of the radiation imaging apparatus 101 based on information input via an operation unit (not illustrated).

The access point 103 is a communication device, such as a radio repeater, which connects the radiation imaging apparatus 101 with apparatuses such as the information processing apparatus 102 by wireless communication. The access point 103 may be arranged inside the radiation imaging apparatus 101.

The hub 104 is a relay apparatus which is connected to a plurality of apparatuses and relays wired communications between the apparatuses.

The radiation interface (radiation I/F) 105 includes a circuit that mediates communications between the radiation generation apparatus 106 and other apparatuses. The radiation I/F 105 monitors a state of the radiation imaging apparatus 101 and the radiation generation apparatus 106.

The radiation generation apparatus 106 is intended to generate the radiations 107 such as X-rays. For example, the radiation generation apparatus 106 includes a radiation tube for accelerating electrons with a high voltage and making the electrons collide with an anode, and a rotor. The radiations 107 may include any of an $\alpha$ ray, a $\beta$ ray, a $\gamma$ ray, and X-rays. An in-hospital local area network (LAN) 108 is a LAN constructed in a hospital. The radiation imaging system 100 is connected to other network devices by wired or wireless communication via the in-hospital LAN 108.

The charging apparatus 109 is an apparatus for charging the radiation imaging apparatus 101. The charging apparatus 109 is used to charge the radiation imaging apparatus 101 with power for a next imaging operation. For example, a cradle can be suitably used as the charging apparatus 109.

The radiation imaging system 100 can perform imaging in a plurality of imaging modes. The plurality of imaging modes includes at least a first imaging mode, a second imaging mode, and a third imaging mode. The radiation imaging apparatus 101 can be set to one of the plurality of imaging modes based on an operation on the information processing apparatus 102.

The first imaging mode (synchronous imaging) is an imaging mode in which the radiation imaging apparatus 101 and the radiation generation apparatus 106 exchange electrical synchronization signals for synchronizing imaging timing. Synchronizing the imaging timing refers to matching the irradiation timing of the radiations 107 with a period in which a radiation detector accumulates charges. The second imaging mode (asynchronous imaging) is an imaging mode in which the radiation imaging apparatus 101 and the radiation generation apparatus 106 do not exchange synchronization signals with each other, and the radiation imaging apparatus 101 detects incidence of the radiations 107 by itself and starts to accumulate charges. In the first and second imaging modes, a captured radiation image is transferred to the information processing apparatus 102 each time. The third imaging mode is an imaging mode in which captured radiation images are not transferred to the information processing apparatus 102 each time, and the radiation images are stored in a storage unit 15 in the radiation imaging apparatus 101. The third imaging mode can be said to be an imaging mode in which a captured radiation image is not transferred to the information processing apparatus 102 each time.

Differences between the plurality of imaging modes will be described in detail. The synchronous imaging, which is the first imaging mode, will initially be described. In the synchronous imaging, if a radiation irradiation switch (not illustrated) is pressed, the radiation generation apparatus 106 transmits a signal (depression signal) indicating the pressing to the radiation imaging apparatus 101. The depression signal can be delivered to the radiation imaging apparatus 101 through the radiation I/F 105, the hub 104, and the access point 103. The radiation imaging apparatus 101 receives the depression signal and transmits a signal indicating that imaging is ready, to the radiation generation apparatus 106. Receiving the signal from the radiation imaging apparatus 101, the radiation generation apparatus 106 irradiates the information imaging apparatus 101 with the radiations 107.

Next, the asynchronous imaging, which is the second imaging mode, will be described. In the asynchronous imaging, the radiation I/F 105 is not provided, and the radiation imaging apparatus 101 detects the irradiation of the radiations 107 from the radiation generation apparatus 106. The radiation imaging apparatus 101 accumulates charges and generates a radiation image based on the accumulated charges. In the asynchronous imaging, the radiation imaging apparatus 101 may transfer the captured radiation image to the information processing apparatus 102 each time. The radiation imaging apparatus 101 may store captured images in a storage unit (storage unit 15 in FIG. 2) without transferring the images each time, and collectively transfer the stored images.

Memory imaging, which is the third imaging mode, will be described. The memory imaging is an imaging mode in which captured radiation images are not transferred each time, and the radiation images are stored in the storage unit 15 in the radiation imaging apparatus 101. In the memory imaging, the radiation imaging apparatus 101 detects the incidence of the radiations 107 by itself. In the memory imaging, the radiation imaging apparatus 101 can perform imaging in a configuration without the radiation I/F 105, the information processing apparatus 102, the access point 103, or the hub 104. In the memory imaging, the radiation imaging apparatus 101 and the information processing apparatus 102 do not need to communicate a captured radiation image or information such as an imaging protocol each time, and the radiation imaging apparatus 101 can obtain the radiation image by itself. In the memory imaging, the radiation imaging apparatus 101 does not perform communication with the information processing apparatus 102 upon each imaging operation, and can store captured radiation images in the storage unit 15 and collectively transfer the stored radiation images to the information processing apparatus 102 afterward for efficient imaging.

Such imaging modes may be set by accepting an input to an operation unit 6 included in the radiation imaging apparatus 101.

The first and second imaging modes are described to transfer a captured radiation image to the information processing apparatus 102 each time. However, this is not restrictive. Even in the synchronous image, the radiation imaging apparatus 101 may store captured images in the storage unit 15 instead of transferring the images each time.

Figure 2:
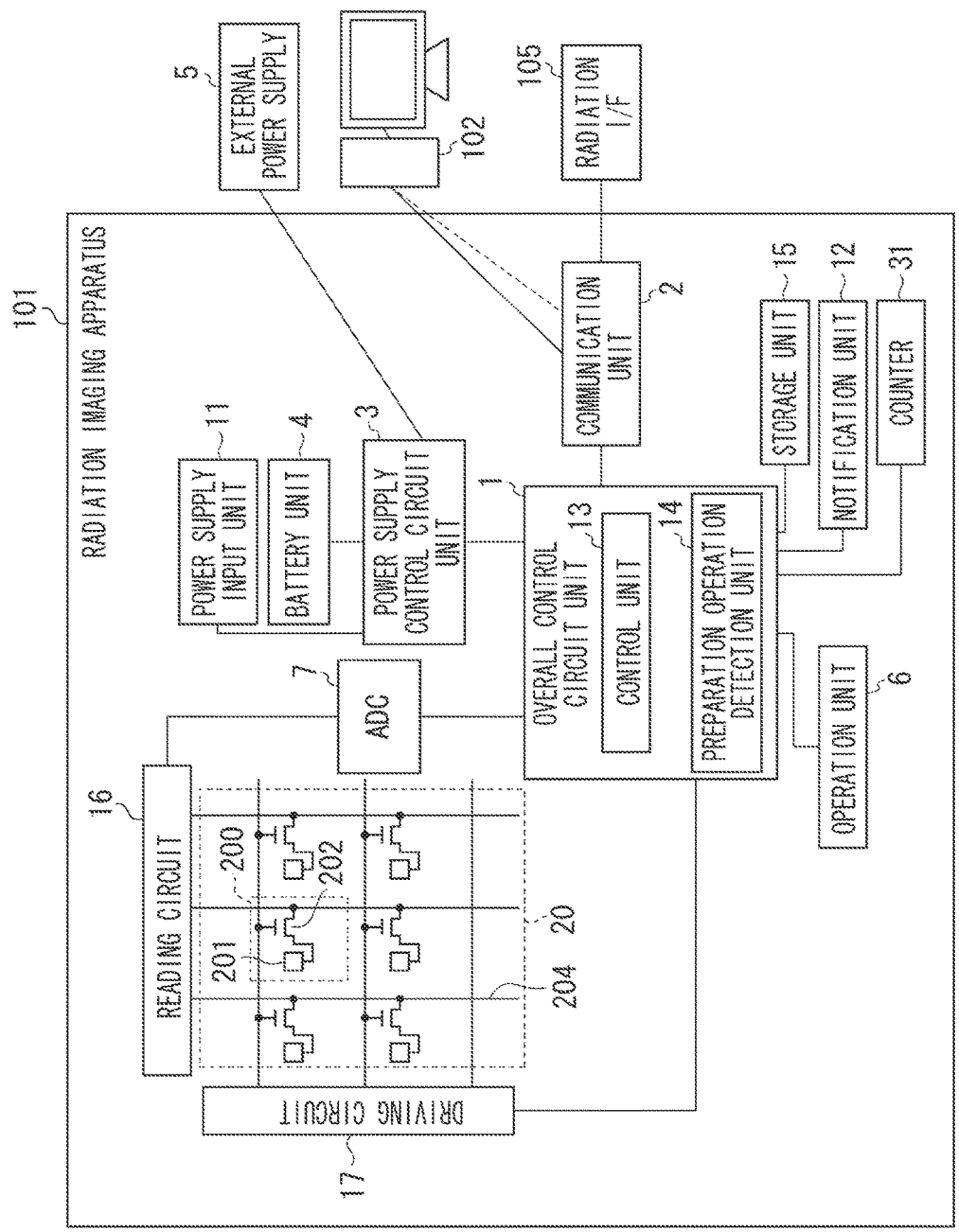
FIG. 2 is a diagram illustrating a configuration of a radiation imaging apparatus according to the first exemplary embodiment.

Next, an overall configuration of the radiation imaging apparatus 101 according to the first exemplary embodiment will be described with reference to FIG. 2. FIG. 2 is a diagram illustrating an example or a general configuration of the radiation imaging apparatus 101 according to the first exemplary embodiment.

An overall control circuit unit 1 controls the entire operation of the radiation imaging apparatus 101. For example, the overall control circuit unit 1 includes a control unit 13 which controls a notification unit 12, and a preparation operation detection unit 14 which detects an imaging preparation operation.

For example, a communication unit 2 wirelessly performs communication with the information processing apparatus 102 and the radiation I/F 105 via the hub 104. The communication unit 2 may perform communication with the information processing apparatus 102 and the radiation I/F 105 in a wired manner.

A power supply control circuit unit 3 establishes connection with a battery unit 4 and an external power supply 5 according to an operation status of a power supply input unit 11 (power button). The power supply control circuit unit 3 thereby controls power supply from the battery unit 4 and the external power supply 5 to various components, and monitors a remaining battery level. For example, the power supply control circuit unit 3 transforms a voltage from the battery unit 4 into a predetermined voltage, and supplies the resulting predetermined voltage to various components.

The battery unit 4 includes a battery. The battery can be charged by the charging apparatus 109. The battery unit 4 supplies a predetermined voltage charged in the battery to the power supply control circuit unit 3. For example, the battery unit 4 uses a lithium ion battery or an electric double layer capacitor. The external power supply 5 supplies a predetermined voltage from an external power source. The external power supply 5 may be the charging apparatus 109 (cradle) illustrated in FIG. 1.

The operation unit 6 is an operation device which a user operates to accept an input for starting imaging. Such an operation includes an operation for starting to supply power to various components and an operation for switching the imaging modes. The preparation operation detection unit 14 detects an operation of the operation unit 6 and notifies the control unit 13 that an imaging preparation operation has been performed. The operation unit 6 is an input device for accepting user operations. Examples include a character information input device such as a keyboard, a pointing device such as a mouse and a touch panel, a button, a dial, a joystick, a touch sensor, and a touch pad.

The power supply input unit 11 has a function of accepting, from outside, operations to start and stop supplying power to various components of the radiation imaging apparatus 101. Examples of the power supply input unit 11 may include a push button switch, a changeover switch, and a touch panel. For example, if the external power supply 5 is not connected, the power supply input unit 11 is pressed to switch on/off the power supply from the battery unit 4.

An analog-to-digital converter (ADC) 7 is an analog-to-digital conversion circuit. The ADC 7 converts an analog signal transmitted from a reading circuit 16 into a digital signal. The ADC 7 may be integrated with the reading circuit 16 or the overall control circuit unit 1.

A radiation detection unit 20 detects the radiations 107 transmitted through the object H as an image signal (charges). The radiation detection unit 20 can directly or indirectly convert the radiations 107 into the image signal (charges).

The radiation detection unit 20 includes a plurality of pixels 200 which is arranged in a two-dimensional matrix on a substrate. Each of the plurality of pixels 200 includes a switch element 202 and a photoelectric conversion element 201. The photoelectric conversion element 201 converts light converted by a phosphor (not illustrated) into a charge and accumulates the charge. A driving circuit 17 constitutes a driving circuit unit which supplies a driving signal to the radiation detecting unit 20. Specifically, if the driving circuit 17 selects a row of pixels 200 by the driving signal, the switch elements 202 of the pixels 200 in that row are sequentially turned on. The charges accumulated in the photoelectric conversion elements 201 of the pixels 200 in that row are output to signal lines 204 connected to the respective pixels 200. The reading circuit 16 sequentially reads the charges output to the signal lines 204. The ADC 7 converts the analog image signal read by the reading circuit 16 into a digital image signal, and outputs the digital image signal to the overall control circuit unit 1 as a radiation image. In other words, the ADC 7 converts the analog image signal read by the reading circuit 16 into digital data. The overall control circuit unit 1 stores the digital data output from the ADC 7 into the storage unit 15 as radiation image data.

The notification unit 12 (including devices, circuits, and program-coded circuits having the corresponding function) makes a notification if a radiation image is stored in the storage unit 15 when an imaging preparation operation is performed.

For example, the notification unit 12 has a display function of displaying in an identifiable manner whether a radiation image is stored in the storage unit 15. In such a case, the notification unit 12 may be a light-emitting diode (LED) which makes a notification by changing a blinking pattern or by changing color.

For example, the notification unit 12 may have a function of issuing sound from which whether a radiation image is stored in the storage unit 15 can be identified. The notification unit 12 may be one that issues sound waves, such as a speaker. For example, the notification unit 12 may have a function of producing vibrations from which it can be determined whether a radiation image is stored in the storage unit 15. The notification unit 12 may have a plurality of functions among the display function, the function of issuing sound, and the function of producing vibrations. By any of the foregoing notifications, the notification unit 12 enables the user to recognize the presence or absence of an untransferred image stored in the radiation imaging apparatus 101. Specific modes of the notification unit 12 will be described below with reference to FIGS. 4A to 4C.

As employed herein, an untransferred image refers to a captured radiation image that is stored in the storage unit 15 and not yet transferred to the information processing apparatus 102. Being untransferred is not limited to a radiation image that the radiation imaging apparatus 101 has never performed processing for transferring to the information processing apparatus 102. For example, untransferred images may include a radiation image that the radiation imaging apparatus 101 has performed the processing for transferring to the information processing apparatus 102 and quit transferring in the middle of the processing, with only a part of the data of the radiation image transferred.

A counter 31 displays information indicating the number of radiation images (untransferred images) stored in the storage unit 15. For example, the counter 31 displays a number indicating the number of untransferred images on a display. The counter 31 may make a notification so that the number of untransferred images can be identified from the color of a section (for example, background) other than a number displayed on the counter 31 or from whether the counter 31 is lit. For example, if there is any untransferred image in the storage unit 15, the control unit 13 may display the number of untransferred images on the counter 31. If there is no untransferred image, the counter 31 may be turned off. If the number (information amount) of untransferred images reaches an upper limit value of a storage capacity of the storage unit 15 or the value to the upper limit falls below a threshold, the control unit 13 may change the color of or blink the number displayed on the counter 31.

The control unit 13 performs notification control on the notification unit 12 based on the preparation operation detection unit 14 which detects an imaging preparation operation, and the information indicating the presence or absence of an untransferred image stored in the storage unit 15. The control unit 13 may perform control to count the number of untransferred images stored in the storage unit 15 and display the number of images on the counter 31. In the present exemplary embodiment, the control unit 13 functions as a notification control unit for controlling notification. The control unit 13 may be a device, a circuit, or a program-coded circuit having such a function. Examples include a central processing unit (CPU).

The preparation operation detection unit 14 (including devices, circuits, and program-coded circuits having the corresponding function) has a function of detecting that an imaging preparation operation is performed. As employed herein, an imaging preparation operation refers to a preparation operation that is performed in advance of capturing of a radiation image by the radiation imaging apparatus 101. For example, an imaging preparation operation includes an operation for starting to supply power to the radiation imaging apparatus 101. The operation for starting to supply power to the radiation imaging apparatus 101 includes an operation for detecting that the radiation imaging apparatus 101 is connected to (attached to, accommodated in, or mounted on) the charging apparatus 109. Specifically, the control unit 13 obtains a detection signal indicating that the radiation Imaging apparatus 101 is connected to the charging apparatus 109.

An imaging preparation operation includes an operation for establishing connection with the information processing apparatus 102. The operation for establishing connection with the information processing apparatus 102 includes an operation in which the radiation imaging apparatus 101 receives a parameter for wireless communication, or requests an operation for establishing communication from the information processing apparatus 102 and receives a response to the request. A case in which a wireless LAN technique is employed for a communication system between the radiation imaging apparatus 101 and the information processing apparatus 102 will be described as an example. In such a case, the same service set identifier (SSID), authentication method, encryption type, and encryption key are set to establish wireless connection between the apparatuses. Such information is exchanged, for example, by communication through a wired connection between the radiation imaging apparatus 101 and the information processing apparatus 102, a connection via the charging apparatus 109, infrared communication, or near field wireless communication.

An imaging preparation operation may include an operation for changing the imaging mode of the radiation imaging apparatus 101 between the plurality of imaging modes. However, an imaging preparation operation is not limited to the foregoing as long as the operation is intended to prepare for imaging.

The preparation detection unit 14 detects an imaging preparation operation, and the control unit 13 controls the notification unit 12 to make a notification based on the presence or absence of an untransferred image stored in the storage unit 15. The user can thereby be prompted to transfer the captured image(s) to the information processing apparatus 102 before starting imaging. The radiation imaging apparatus 101 can thus prevent omission of transfer of the radiation image(s).

The storage unit 15 (including devices, circuits, and program-coded circuits having the corresponding function) stores captured radiation images.

The storage unit 15 identifiably stores whether a radiation image is one transferred to the information processing apparatus 102. In other words, the storage unit 15 associates and stores information from which whether a radiation image is an untransferred image can be identified.

The storage unit 15 may store a captured radiation image and the information about imaging in association with each other. If imaging is performed in the foregoing third imaging mode, the storage unit 15 stores captured radiation images without transferring the radiation images to the information processing apparatus 102 each time. The storage unit 15 may store radiation images captured in the foregoing first and second imaging modes.

As employed herein, the information about imaging may include an operator identifier (ID) which is an ID assigned to each operator, and a patient ID which is assigned to a patient. The information about imaging may further include an imaging time which is the time at which the imaging is performed, a reached dose which is a dose reaching the radiation imaging apparatus 101, and a region name. The storage unit 15 may store the number of captured images (counter) obtained by incrementing the number of images captured and a transfer history of radiation images as the information about imaging. The control unit 13 may display (output) the information stored in the storage unit 15 on the notification unit 12, along with the information about the presence or absence of a radiation image.

The storage unit 15 is a device capable of reading and writing. For example, a nonvolatile memory such as a flash memory can be suitably used. The storage unit 15 may be configured to be detachably attachable to the radiation imaging apparatus 101, similar to a Secure Digital (SD) card. In such a case, the storage unit 15 can be loaded into the information processing apparatus 102 to transfer radiation images and the information about imaging.

Figure 3:
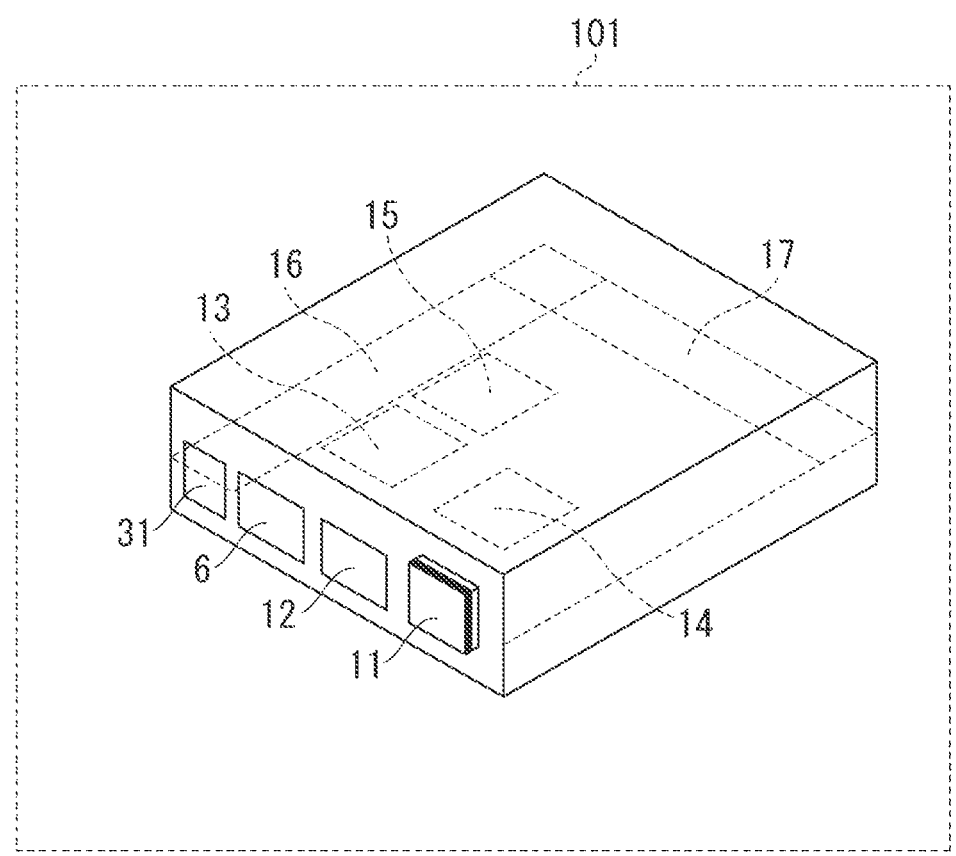
FIG. 3 is a diagram illustrating the configuration of the radiation imaging apparatus according to the first exemplary embodiment.

Next, an example of arrangement of various components in the radiation imaging apparatus 101 according to the first exemplary embodiment will be described with reference to FIG. 3. FIG. 3 is a diagram illustrating an example of a configuration of the radiation imaging apparatus 101 according to the first exemplary embodiment. In the radiation imaging apparatus 101, the following components are arranged in positions not irradiated with the radiations 107 during imaging: the operation unit 6, the power supply input unit 11, the notification unit 12, the control unit 13, the preparation operation detection unit 14, the storage unit 15, the reading circuit 16, and the driving circuit 17.

In FIG. 3, the operation unit 6, the power supply input unit 11, and the notification unit 12 are arranged on a side surface of the radiation imaging apparatus 101. Such units have only to be arranged in positions where the radiations 107 are not incident, and may be arranged on a surface (rear surface) opposite to the surface where the radiations 107 are incident on the radiation imaging apparatus 101. The operation unit 6, the power supply input unit 11, and the notification unit 12 may be arranged on the surface on which the radiations 107 are incident, outside the area where the radiation detection unit 20 can detect the radiations 107. The operation unit 6, the power supply input unit 11, and the notification unit 12 are arranged on the same surface of the radiation imaging apparatus 101. However, this is not restrictive, and the operation unit 6, the power supply input unit 11, and the notification unit 12 may be arranged on respective different surfaces. The operation unit 6, the power supply input unit 11, and the notification unit 12 are arranged at least on a side or sides different from where the reading circuit 16 and the driving circuit 17 are.

Figure 4A:
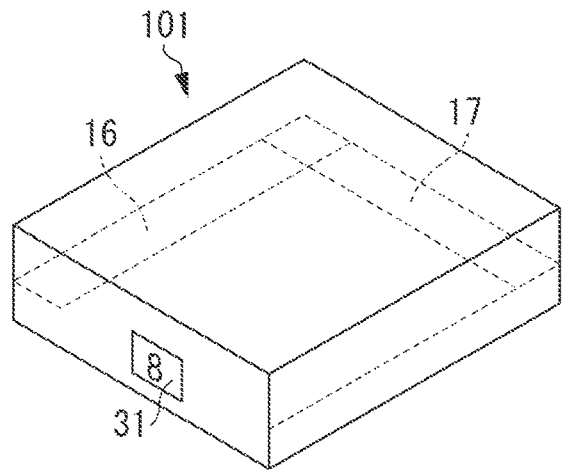
FIGS. 4A, 4B, and 4C are diagrams illustrating examples of a notification unit according to the first exemplary embodiment.
Figure 4B:
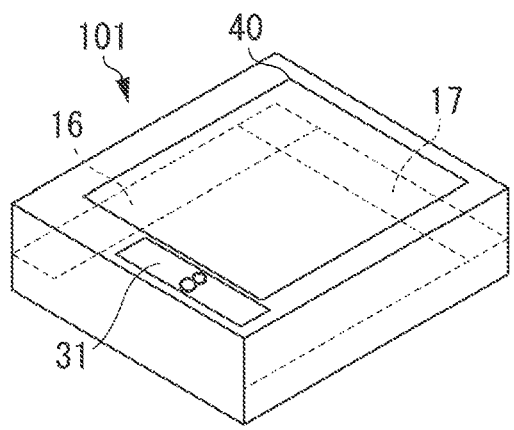
Figure 4C:
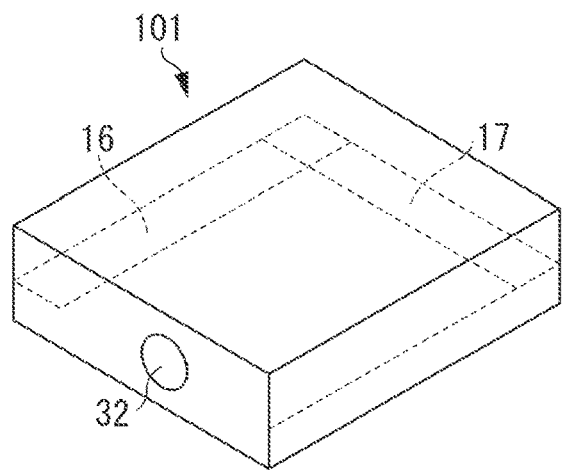

Modes of the notification unit 12 according to the first exemplary embodiment will be described with reference to FIGS. 4A, 4B, and 4C. FIGS. 4A, 4B, and 4C are diagrams illustrating examples of the counter 31 and the notification unit 12 according to the first exemplary embodiment.

FIG. 4A illustrates an example where the counter 31 has the function of displaying the number of radiation images (untransferred images) stored in the storage unit 15.

The notification unit 12 may make a notification of the presence or absence of an untransferred image by turning on, turning off, or blinking an LED. The notification unit 12 may use a display to make a notification of the presence or absence of a radiation image by using character information. For example, if there is an untransferred image in the storage unit 15, the notification unit 12 can identifiably make a notification by a character string displaying "there is an untransferred image." If there is no untransferred image, the notification unit 12 can identifiably make a notification by a character string displaying "there is no untransferred image."

FIG. 4B illustrates an example where the counter 31 is arranged on the surface where the radiations 107 are incident on the radiation imaging apparatus 101. In the illustrated example, the counter is arranged in a position other than a radiation detection area 40 on which the radiations 107 are incident. The user's visibility improves as compared to when the counter 31 is arranged on a side surface.

FIG. 4C is a diagram illustrating a case where the notification unit 12 is a speaker 32. The speaker 32 has a function of making a notification of the presence or absence of an untransferred image in the storage unit 15 by using sound. For example, if there is an untransferred image in the storage unit 15, the speaker 32 outputs sound. If there is no untransferred image, the speaker 32 does not output sound. The notification unit 12 may change the frequency of the sound or switch the sound to be output depending on the presence or absence of an untransferred image. In other words, the speaker 32 may make a notification of an untransferred image not only by the presence or absence of sound, but also by changing the loudness, pitch, and/or rhythm of the sound. In such a case, the loudness, pitch, and/or rhythm of the sound of the speaker 32 can be implemented by changing settings. Such settings can be changed by an input from the operation unit 6 of the radiation imaging apparatus 101 or an operation unit of the information processing apparatus 102. The speaker 32 is thereby appropriately set and adjusted so that the user can appropriately recognize the sound, regardless of the place where the radiation imaging apparatus 101 and the information processing apparatus 102 are used or the imaging procedure (general radiography or mobile radiography). The radiation imaging apparatus 101 may also issue sound in scenes other than when the presence or absence of an untransferred image concerned. Examples of such scenes include when the remaining level of the battery falls to or below a predetermined value, and when the imaging mode is changed. Specifically, the speaker 32 makes a notification of the presence or absence of an untransferred image and of the other scenes by changing the loudness, pitch, and/or rhythm of the sound, or by changing sound intervals. In such a manner, the speaker 32 is controlled to issue an identifiable sound for each scene.

While the speaker 32 is arranged in a side surface of the radiation imaging apparatus 101, as in FIG. 4B, the speaker 32 may be arranged on any surface except in the incident direction of the radiations 107. The notification unit 12 may include a plurality of notification units such as the speaker 32. If the notification unit 12 is configured as the speaker 32, the user can recognize the presence or absence of an untransferred image, even in cases where visible observation is difficult. A plurality of notification units 12 such as the counter 31 and the speaker 32 can be combined to increase the possibility for the user to recognize the presence or absence of an untransferred image.

In the foregoing example, the notification unit 12 is described to change the notification method according to the presence or absence of an untransferred image. However, this is not restrictive. For example, the notification unit 12 may further change the notification method in relation to the upper limit of the number of images. For example, suppose that the upper limit of the number of images in the storage unit 15 is 100. The notification unit 12 may make a notification in different manners when the number of images is between 1 and 50 and when the number of images is greater than 50.

Next, a configuration example of the radiation imaging system 100 when a plurality of notifications is combined according to the imaging mode will be described.

In the first imaging mode and the second imaging mode, the radiation imaging apparatus 101 can communicate with the information processing apparatus 102. The control unit 13 therefore preferably makes a notification of the presence or absence of an untransferred image by using the display unit 110, and makes the counter 31 of the radiation imaging apparatus 101 display the number of untransferred images stored in the storage unit 15. A notification given by the control unit 13 to the information processing apparatus 102 can be issued as a graphical user interface (GUI) popup or an icon on the display unit 110. In such a manner, the control unit 13 causes the information processing apparatus 102 to make a notification of the presence or absence of an untransferred image, whereby the user can recognize the presence or absence of an untransferred image before imaging is performed in the first imaging mode or the second imaging mode.

In the third imaging mode, the radiation imaging apparatus 101 captures radiation images without communicating with the information processing apparatus 102. The control unit 13 preferably makes the counter 31 display the number of untransferred images stored in the storage unit 15, and makes notification of the presence or absence of an untransferred image stored in the storage unit 15 by using the sound of the speaker 32 included in the radiation imaging apparatus 101.

While desirable configurations in the respective imaging modes have been described above, the notification unit 12 may be implemented without being limited to such configurations. A plurality of notification methods, for example, a plurality of notification units 12 can be combined to increase the possibility for the user to recognize the presence or absence of an untransferred image. The radiation imaging apparatus 101 can also make the user recognize the presence or absence of an untransferred image without communicating with the information processing apparatus 102. The user then prevents a plurality of radiation images from being mixed and becoming difficult to be distinguished from one another.

Figure 5:
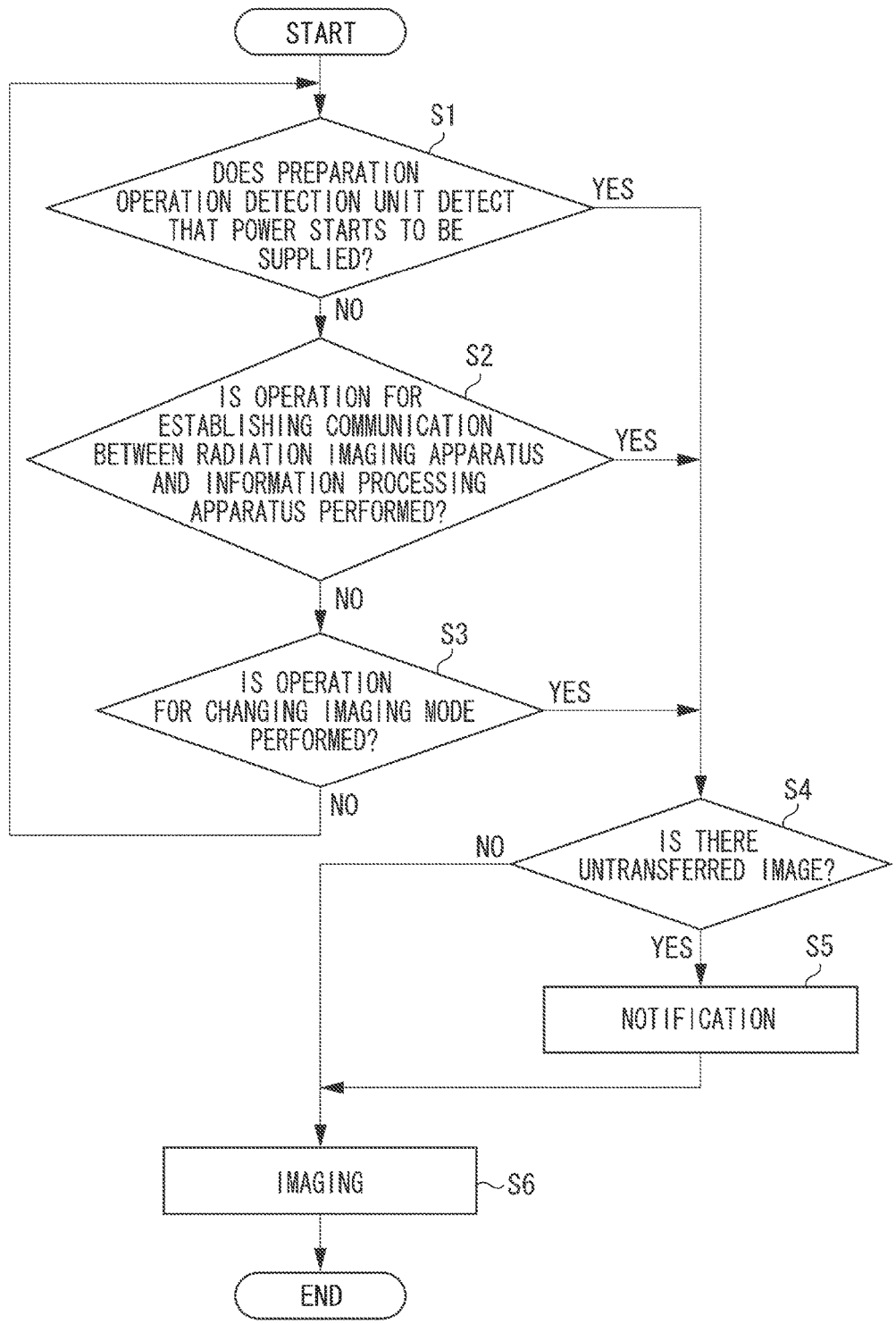
FIG. 5 is a flowchart illustrating a relationship between an imaging preparation operation and a notification according to the first exemplary embodiment.

Next, a series of operations for the radiation imaging apparatus 101 to make a notification of the presence or absence of an untransferred image based on an imaging preparation operation will be described with reference to FIG. 5. FIG. 5 is a flowchart illustrating a relationship between an imaging preparation operation of the radiation imaging apparatus 101 and a notification according to the first exemplary embodiment.

In step S1, the preparation operation detection unit 14 detects that power starts to be supplied to the radiation imaging apparatus 101. If a start of power supply is detected (YES in step S1), the processing proceeds to step S4.

If the preparation operation detection unit 14 does not detect power supply to the radiation imaging apparatus 101 (NO in step S1), the processing proceeds to step S2. That power supply is not detected refers to a case where no power is supplied from an external power supply different from the radiation imaging apparatus 101. Examples include a case where the radiation imaging apparatus 101 is not connected to the charging apparatus 109.

In step S2, the preparation operation detection unit 14 detects whether an operation for establishing communication between the radiation imaging apparatus 101 and the information processing apparatus 102 is performed. If such an operation is detected (YES in step S2), the processing proceeds to step S4. If not (NO in step S2), the processing proceeds to step S3.

In step S3, the preparation operation detection unit 14 detects whether an operation for changing (or setting) the imaging mode of the radiation imaging apparatus 101 is performed. If the operation for switching the imaging mode is detected (YES in step S3), the processing proceeds to step S4. If the operation for switching the imaging mode is not detected (NO in step S3), the processing returns to step S1.

Step S4 is processing that the control unit 13 performs if the preparation operation detection unit 14 detects any of the imaging preparation operations described in steps S1 to S3. If the preparation operation detection unit 14 detects an imaging preparation operation, the control unit 13 obtains a detection signal indicating the detection. The control unit 13 controls the notification unit 12 to make a notification based on the detection signal and information about whether a radiation image is stored in the storage unit 15. For example, the control unit 13 may determine whether there is an untransferred image in the storage unit 15. The control unit 13 may obtain the information indicating the presence or absence of an untransferred image in advance before the detection by the preparation operation detection unit 14.

In step S4, if a radiation image is stored in the storage unit 15 (there is an untransferred image) (YES in step S4), the processing proceeds to step S5. In step S4, if a radiation image is not stored in the storage unit 15 (there is no untransferred image) (NO in step S4), the processing proceeds to step S6 without the control unit 13 controlling the notification unit 12. The control unit 13 may change a control method of the notification unit 12 based on the presence or absence of an untransferred image before performing step S6. Changing the control method refers to changing the manner of issuing sound and/or the manner of display. In such a case, the control unit 13 may transfer the information about the presence or absence of an untransferred image to the information processing apparatus 102.

In step S5, the control unit 13 controls the notification unit 12 to make a notification.

In step S6, the radiation imaging apparatus 101 performs imaging.

As described above, the radiation imaging apparatus 101 according to the present exemplary embodiment includes the radiation detector which detects the radiations 107 transmitted through the object H, and the storage unit 15 which stores a radiation image based on the detected radiations 107. The radiation imaging apparatus 101 identifiably stores whether the radiation image is one transferred to the information processing apparatus 102. Untransferred images and other images can thus be easily identified in the storage unit 15. If a radiation image is stored in the storage unit 15 when an imaging preparation operation is performed, the control unit 13 (notification control unit) controls the notification unit 12 to make a notification. Such a control can provide a technique advantageous in suppressing the user's omission of image transfer if there is a captured image not transferred to the information processing apparatus 102. Radiation images obtained by past imaging and radiation images obtained by new imaging can be prevented from being mixed. Radiation images obtained by past imaging, stored in the storage unit 15, can be further prevented from being overwritten with radiation images obtained by new imaging.

Figure 6:
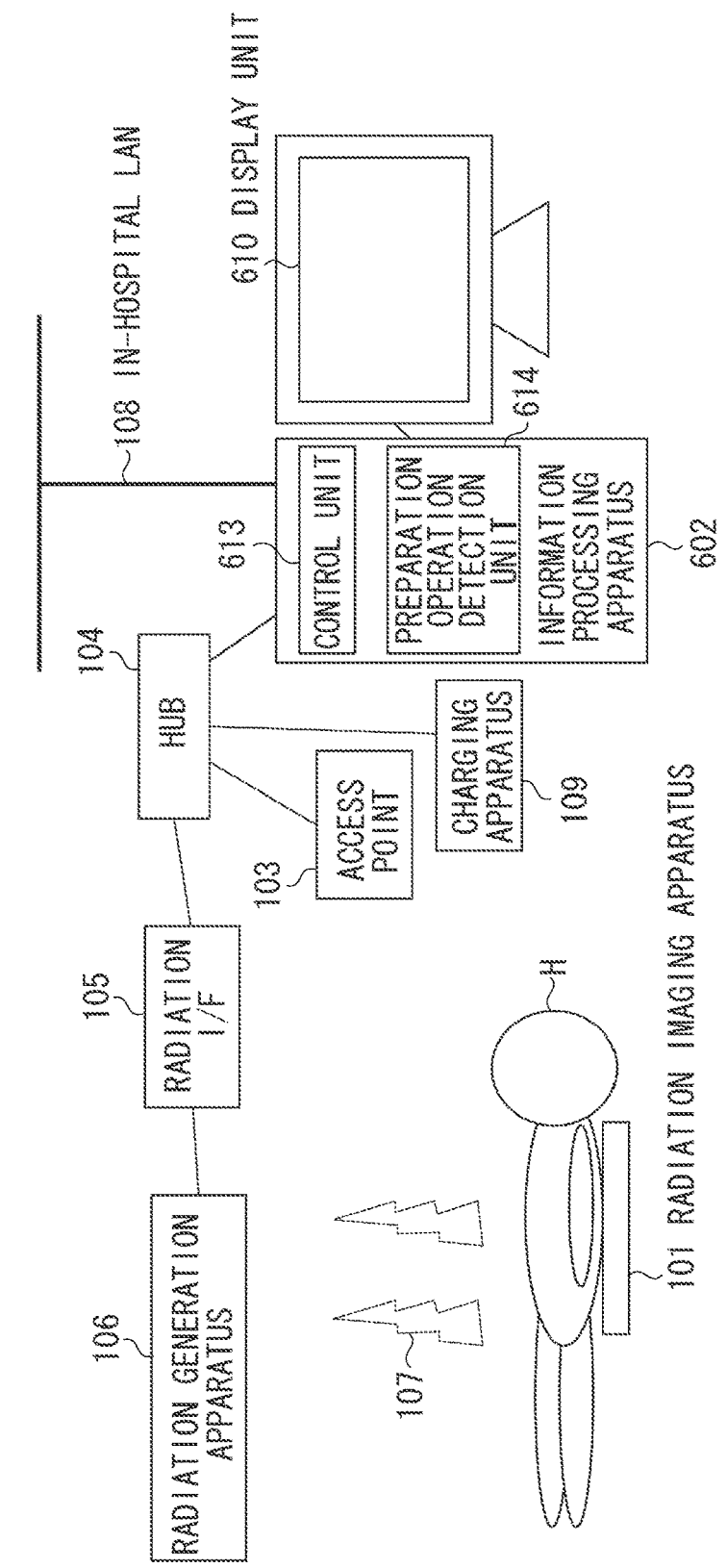
FIG. 6 is a diagram illustrating a radiation imaging system according to a second exemplary embodiment.

A radiation imaging system 600 according to a second exemplary embodiment will be described with reference to FIG. 6. Unlike the first exemplary embodiment, the second exemplary embodiment describes a case where an information processing apparatus 602 detects an imaging preparation operation and makes a notification. In other respects, descriptions similar to those of the first exemplary embodiment will be omitted.

The radiation imaging system 600 includes at least the radiation imaging apparatus 101 and the information processing apparatus 602. The information processing apparatus 602 includes at least a control unit 613 and a preparation operation detection unit 614.

If there is a radiation image stored in the storage unit 15 when the radiation imaging apparatus 101 performs an imaging preparation operation after capturing of a radiation image, the control unit 613 controls a notification unit included in the information processing apparatus 602 to make a notification. In the present exemplary embodiment, the notification unit may be a display unit 610 of the information processing apparatus 602. Examples of the display unit 610 include a display that shows a visual representation of the notification. The control unit 613 functions as a notification control unit for controlling notification.

The preparation operation detection unit 614 can detect an imaging preparation operation. The preparation operation detection unit 614 can detect whether power is supplied, based on information about whether the radiation imaging apparatus 101 is connected to the charging apparatus 109 or whether charging is started. In such a case, the preparation operation detection unit 614 can obtain the information via the hub 104. If wireless communication is established between the radiation imaging apparatus 101 and the information processing apparatus 602, the preparation operation detection unit 614 obtains the information by the wireless communication via the access point 103. Similar to the first exemplary embodiment, the preparation operation detection unit 614 can detect an operation for establishing communication between the radiation imaging apparatus 101 and the information processing apparatus 602.

If the preparation operation detection unit 614 detects an imaging preparation operation and there is an untransferred image stored in the storage unit 15, the control unit 613 controls the display unit 610. The control unit 613 can control the notification unit to make a notification by using a popup or an icon on a GUI for identifiable display.

The control unit 613 may perform control to only make a notification of the presence or absence of an untransferred image that is captured in the third imaging mode and stored in the storage unit 15, and not to make a notification of the presence or absence of an untransferred image that is captured in the first or second imaging mode. Such a control can save the checking processing and the user's labor and enable efficient imaging if the imaging mode is changed between the first and second imaging modes without the third imaging mode being set. In making a notification of the presence or absence or an untransferred image, the control unit 613 may provide a display for selecting whether to transfer the image to the information processing apparatus 602, or a display only for prompting a warning.

As described above, according to the present exemplary embodiment, the information processing apparatus 602 can detect an imaging preparation operation with the preparation operation detection unit 614, and make a notification of the presence or absence of an untransferred image stored in the storage unit 15. Even in a situation where the user not able to directly check the notification unit 12 arranged on the radiation imaging apparatus 101, the notification by the information processing apparatus 602 enables the user to recognize the presence or absence of an untransferred image.

The exemplary embodiments have been described in detail above. The present invention is not limited to such specific exemplary embodiments, and various modes implemented without departing the gist of the invention are also covered by the scope of an exemplary embodiment of the present invention. The foregoing exemplary embodiments demonstrate just a few modes of embodiment, and inventions easily conceivable from the foregoing exemplary embodiments are also covered by the scope of an exemplary embodiment of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-232530, filed Nov. 28, 2015, which is hereby incorporated by reference herein in its entirety.

What is claimed is:

1. A radiation imaging apparatus comprising:
    a radiation detector configured to detect radiation transmitted through an object;
    a storage unit configured to identifiably store a radiation image based on the detected radiation to identify whether the stored radiation image is a radiation image transferred from the radiation imaging apparatus; and
    a notification control unit configured to control a notification unit to make a notification if a radiation image not transferred from the radiation imaging apparatus is stored in the storage unit,
    wherein, if an imaging mode in which a captured radiation image is not transferred from the radiation imaging apparatus each time a radiation image is captured is set, the notification control unit is configured to control the notification unit to make a notification according to an operation for changing the imaging mode to another imaging mode.

2. The radiation imaging apparatus according to claim 1, further comprising a display control unit configured to identifiably display a number of radiation images not transferred from the radiation imaging apparatus.

3. The radiation imaging apparatus according to claim 1, wherein, if a radiation image not transferred from the radiation imaging apparatus is stored in the storage unit when an imaging preparation operation is performed, the notification control unit is configured to control the notification unit to make a notification.

4. The radiation imaging apparatus according to claim 3, wherein the imaging preparation operation includes an operation for starting to supply power to the radiation imaging apparatus.

5. The radiation imaging apparatus according to claim 4,
    wherein the operation for starting to supply power to the radiation imaging apparatus includes an operation for detecting that the radiation imaging apparatus is connected to a charger, and
    wherein the notification control unit is configured to control the notification unit to make a notification based on a detection signal indicating that the radiation imaging apparatus is connected to the charger.

6. The radiation imaging apparatus according to claim 3,
    wherein the radiation imaging apparatus is capable of wireless communication with an external information processing apparatus, and
    wherein the imaging preparation operation includes an operation for establishing the wireless communication between the radiation imaging apparatus and the external information processing apparatus.

7. The radiation imaging apparatus according to claim 6, wherein the operation for establishing the wireless communication with the external information processing apparatus includes an operation for receiving a parameter for performing the wireless communication from the external information processing apparatus.

8. The radiation imaging apparatus according to claim 3
    wherein the imaging preparation operation includes an operation for setting any one imaging mode of a plurality of imaging modes for the radiation imaging apparatus, and
    wherein, if a radiation image captured in the set any one imaging mode is stored, the notification control unit is configured to control the notification unit to make a notification according to an operation for changing the set any one imaging mode to a second imaging mode.

9. The radiation imaging apparatus according to claim 8, wherein the plurality of imaging modes includes at least the imaging mode in which a captured radiation image is not transferred from the radiation imaging apparatus each time a radiation image is captured.

10. The radiation imaging apparatus according to claim 9, wherein the notification control unit is configured to control to not make a notification if an operation for changing the second imaging mode to the imaging mode in which a captured radiation image is not transferred each time is performed.

11. The radiation imaging apparatus according to claim 1, further comprising the notification unit,
wherein the notification unit is configured to display in an identifiable manner whether a radiation image is stored in the storage unit.

12. The radiation imaging apparatus according to claim 1, further comprising the notification unit,
wherein the notification unit is configured to issue sound from which whether a radiation image is stored in the storage unit is identifiable.

13. A radiation imaging system comprising:
an external information processing apparatus; and
the radiation imaging apparatus according to claim 1.

14. A method for controlling a radiation imaging apparatus having a radiation detector and a storage unit, the method comprising:
detecting, via the radiation detector, radiation transmitted through an object;
identifiably storing, in the storage unit, a radiation image based on the detected radiation to identify whether the stored radiation image is a radiation image transferred from the radiation imaging apparatus; and
controlling to make a notification if a radiation image not transferred from the radiation imaging apparatus is stored in the storage unit,
wherein, if an imaging mode in which a captured radiation image is not transferred from the radiation imaging apparatus each time a radiation image is captured is set, controlling includes controlling to make a notification according to an operation for changing the imaging mode to another imaging mode.

15. A radiation imaging apparatus comprising:
a radiation detector configured to detect radiation transmitted through an object;
a storage unit configured to identifiably store a radiation image based on the detected radiation to identify whether the stored radiation image is a radiation image transferred from the radiation imaging apparatus; and
a notification control unit configured to control a notification unit to make a notification if a radiation image not transferred from the radiation imaging apparatus is stored in the storage unit,
wherein, if a radiation image not transferred from the radiation imaging apparatus is stored in the storage unit when an imaging preparation operation is performed, the notification control unit is configured to control the notification unit to make a notification,
wherein the imaging preparation operation includes an operation for setting any one of a plurality of imaging modes for the radiation imaging apparatus, and
wherein, if a radiation image captured in the set imaging mode is stored, the notification control unit is configured to control the notification unit to make a notification according to an operation for changing the set imaging mode to another imaging mode.

16. The radiation imaging apparatus according to claim 15, further comprising a display control unit configured to identifiably display a number of radiation images not transferred from the radiation imaging apparatus.

17. The radiation imaging apparatus according to claim 15, wherein the imaging preparation operation includes an operation for starting to supply power to the radiation imaging apparatus.

18. The radiation imaging apparatus according to claim 17,
wherein the operation for starting to supply power to the radiation imaging apparatus includes an operation for detecting that the radiation imaging apparatus is connected to a charger, and
wherein the notification control unit is configured to control the notification unit to make a notification based on a detection signal indicating that the radiation imaging apparatus is connected to the charger.

19. The radiation imaging apparatus according to claim 15,
wherein the radiation imaging apparatus is capable of wireless communication with an external information processing apparatus, and
wherein the imaging preparation operation includes an operation for establishing the wireless communication between the radiation imaging apparatus and the external information processing apparatus.

20. The radiation imaging apparatus according to claim 19, wherein the operation for establishing the wireless communication with the external information processing apparatus includes an operation for receiving a parameter for performing the wireless communication from the external information processing apparatus.

21. The radiation imaging apparatus according to claim 15,
wherein the plurality of imaging modes includes at least a first imaging mode in which a captured radiation image is stored in the storage unit and is not transferred from the radiation imaging apparatus each time a radiation image is captured, and
wherein, if the first imaging mode is set, the notification control unit is configured to control the notification unit to make a notification according to an operation for changing the first imaging mode to a second imaging mode.

22. The radiation imaging apparatus according to claim 21, wherein, if an operation for changing the second imaging mode to the first imaging mode is performed, the notification control unit is configured to control to not make a notification.

23. The radiation imaging apparatus according to claim 15, further comprising the notification unit,
wherein the notification unit is configured to display in an identifiable manner whether a radiation image is stored in the storage unit.

24. The radiation imaging apparatus according to claim 15, further comprising the notification unit,
wherein the notification unit is configured to issue sound from which whether a radiation image is stored in the storage unit is identifiable.

25. A radiation imaging system comprising:
an external information processing apparatus; and
the radiation imaging apparatus according to claim 15.

26. A method for controlling a radiation imaging apparatus having a radiation detector and a storage unit, the method comprising:
detecting, via the radiation detector, radiation transmitted through an object;
identifiably storing, in the storage unit, a radiation image based on the detected radiation to identify whether the stored radiation image is a radiation image transferred from the radiation imaging apparatus; and controlling to make a notification if a radiation image not transferred from the radiation imaging apparatus is stored in the storage unit, wherein, if a radiation image not transferred from the radiation imaging apparatus is stored in the storage unit when an imaging preparation operation is performed, controlling includes controlling to make a notification, wherein the imaging preparation operation includes an operation for setting any one of a plurality of imaging modes for the radiation imaging apparatus, and wherein, if a radiation image captured in the set imaging mode is stored, controlling includes controlling to make a notification according to an operation for changing the set imaging mode to another imaging mode.

27. A radiation imaging apparatus comprising:

a radiation detector configured to detect radiation transmitted through an object;

a storage unit configured to identifiably store a radiation image based on the detected radiation to identify whether the stored radiation image is an untransferred image, wherein the untransferred image includes at least one of a radiation image that has never been transferred and a radiation image that was stopped in the middle of being transferred where only a part of data of the stopped radiation image was transferred; and a notification control unit configured to control a notification unit to make a notification if an untransferred image is stored in the storage unit, wherein, if an imaging mode in which a captured radiation image is not transferred from the radiation imaging apparatus each time a radiation image is captured is set, the notification control unit is configured to control the notification unit to make a notification according to an operation for changing the imaging mode to another imaging mode.

28. A radiation imaging system comprising:
an external information processing apparatus; and
the radiation imaging apparatus according to claim 27.

29. A method for controlling a radiation imaging apparatus having a radiation detector and a storage unit, the method comprising:

detecting, via the radiation detector, radiation transmitted through an object;

identifiably storing, in the storage unit, a radiation image based on the detected radiation to identify whether the stored radiation image is an untransferred image, wherein the untransferred image includes at least one of a radiation image that has never been transferred and a radiation image that was stopped in the middle of being transferred where only a part of data of the stopped radiation image was transferred; and controlling to make a notification if an untransferred image is stored in the storage unit, wherein, if an imaging mode in which a captured radiation image is not transferred from the radiation imaging apparatus each time a radiation image is captured is set, controlling includes controlling to make a notification according to an operation for changing the imaging mode to another imaging mode.

30. A radiation imaging apparatus comprising:

a radiation detector configured to detect radiation transmitted through an object;

a storage unit configured to identifiably store a radiation image based on the detected radiation to identify whether the stored radiation image is an untransferred image, wherein the untransferred image includes at least one of a radiation image that has never been transferred and a radiation image that was stopped in the middle of being transferred where only a part of data of the stopped radiation image was transferred; and a notification control unit configured to control a notification unit to make a notification if an untransferred image is stored in the storage unit when an imaging preparation operation is performed, wherein the imaging preparation operation includes an operation for setting any one of a plurality of imaging modes for the radiation imaging apparatus, and wherein, if a radiation image captured in the set imaging mode is stored, the notification control unit is configured to control the notification unit to make a notification according to an operation for changing the set imaging mode to another imaging mode.

31. A radiation imaging system comprising:
an external information processing apparatus; and
the radiation imaging apparatus according to claim 30.

32. A method for controlling a radiation imaging apparatus having a radiation detector and a storage unit, the method comprising:

detecting, via the radiation detector, radiation transmitted through an object;

identifiably storing, in the storage unit, a radiation image based on the detected radiation to identify whether the stored radiation image is an untransferred image, wherein the untransferred image includes at least one of a radiation image that has never been transferred and a radiation image that was stopped in the middle of being transferred where only a part of data of the stopped radiation image was transferred; and controlling to make a notification if an untransferred image is stored in the storage unit when an imaging preparation operation is performed, wherein the imaging preparation operation includes an operation for setting any one of a plurality of imaging modes for the radiation imaging apparatus, and wherein, if a radiation image captured in the set imaging mode is stored, controlling includes controlling to make a notification according to an operation for changing the set imaging mode to another imaging mode.

* * * * *